United States Patent Office 3,153,059
Patented Oct. 13, 1964

3,153,059
1,4 - DIHYDROXY-2-ALKYLAMINOALKYLAMINO-ANTHRAQUINONE DYE COMPOUNDS AND ACRYLIC MATERIALS DYED THEREWITH
James M. Straley and Raymond C. Harris, Kingsport, Tenn., assignors to Eastman Kodak Company, Rochester, N.Y., a corporation of New Jersey
No Drawing. Filed Dec. 20, 1961, Ser. No. 160,945
7 Claims. (Cl. 260—379)

This invention relates to new anthraquinone compounds, their preparation and their application for the dyeing or coloring of acrylonitrile polymers, especially in the form of textile materials.

We have discovered that the new anthraquinone compounds having the formula:

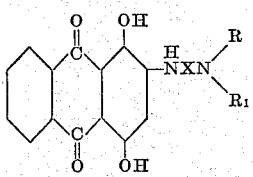

wherein X represents a member selected from the group consisting of an alkylene radical having 2 to 3 carbon atoms and a 2-hydroxytrimethylene radical and R and $R_1$ each represents a member selected from the group consisting of a hydrogen atom and an alkyl group having 1 to 4 carbon atoms, as well as the quaternary ammonium forms thereof, are valuable dyestuffs for acrylonitrile polymers, especially acrylonitrile polymer polymer textile materials in fiber, filament, yarn or fabric form, for example.

A group of the new anthraquinone compounds have the formula

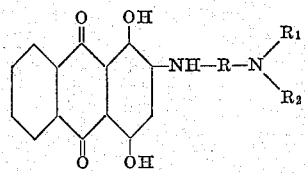

in which A is lower alkylene of two to three carbon atoms and each of $R_1$ and $R_2$ is lower alkyl of one to four carbon atoms.

The new anthraquinone compounds and the quaternary ammonium forms thereof have excellent affinity for acrylonitrile polymer textile materials and yield bright red dyeings on these materials which have good to excellent fastness to light, washing, gas and sublimation. Verel and Orlon 42 are illustrative of the acrylonitrile polymer textile materials that can be dyed with the anthraquinone compounds of our invention.

The new anthraquinone compounds of our invention are readily prepared by reacting a 2-halogen-1,4-dihydroxyanthraquinone compound, such as 2-bromo-1,4-dihydroxyanthraquinone or 2 - chloro - 1,4 - dihydroxyanthraquinone, for example, with an aliphatic diamine compound having the formula:

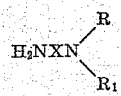

wherein R, $R_1$ and X have the meaning previously assigned to them. If desired, 1,4-dihydroxyanthraquinone-2-sulfonic acid and salts thereof, such as the sodium or potassium salt, can be used in place of the 2-halogen-1,4-dihydroxyanthraquinone compounds just indicated.

The member X represents an alkylene radical such as ethylene, trimethylene and propylene as well as the 2-hydroxytrimethylene radical. Methyl, ethyl, propyl, isopropyl and n-butyl are illustrative of the alkyl radicals represented by R and $R_1$.

Ethylenediamine, N,N-dimethyl-ethylenediamine, N,N-diethylethylenediamine, N,N-di-n-propyl-ethylenediamine, N,N-di-n-butylethylenediamine, N,N - dimethyl - 1,3 - trimethylene diamine, N,N-diethyl-1,3-trimethylenediamine, N,N-di-n-butyl-1,3-trimethylenediamine, N-methyl-N - n-butyl-1,3-trimethylenediamine, N,N-dimethyl-2 - hydroxy-1,3-trimethylenediamine and N,N-diethyl-2-hydroxy - 1,3-trimethylenediamine are illustrative of the aliphatic diamine compounds used in preparing the new anthraquinone compounds of our invention.

Many, if not all, the aliphatic diamine compounds used in preparing the new anthraquinone compounds of our invention are known compounds. Any not specifically disclosed by the prior art can be prepared by the methods used to prepare the known compounds. U.S. Patent 2,968,661 issued January 17, 1961 discloses the preparation of most of these aliphatic diamine compounds.

Quaternization may be carried out in an inert solvent using the known quaternizing agents. A dialkyl sulfate, an alkyl chloride, an alkyl bromide, an alkyl iodide, an aralkyl chloride, an aralkyl bromide or an alkyl ester of para-toluene sulfonic acid, for example, can be employed. Specific quaternizing agents include, for example, dimethyl sulfate, diethyl sulfate, dipropyl sulfate, dibutyl sulfate, ethyl bromide, ethyl chloride, methyl iodide, ethyl iodide, n-butyl iodide, lauryl iodide, benzyl chloride, benzyl bromide, methyl p-toluene sulfonate, ethyl p-toluene sulfonate, n-propyl p-toluene sulfonate and n-butyl p-toluene sulfonate.

Inert solvents that can be used in the quaternization reaction include, for example, dimethyl formamide, acetone, ethylene glycol monoethyl ether, isopropanol, n-butanol, chlorobenzene and nitrobenzene.

Inasmuch as the new quaternary anthraquinone compounds of the present invention are water soluble they are applied to the acrylonitrile polymer textile material from their solution in water, preferably at the boil. The property of water solubilility is of real importance because dyes are almost exclusively applied from an aqueous dyebath. Because the dyes are water soluble the manufacturer thereof is relieved from the costly process of preparing mixes or dispersions that will form suspensions of finely divided solids and the dyer is relieved from the necessity of adding other substances in order to prevent the suspension or emulsion from breaking. If the dye suspension or emulsion breaks, uneven dyeing of the goods results and the dye fails to deliver the full money value of which it is capable. No significant differences appear to depend upon the character of the quaternizing agent used.

The following examples illustrate the invention:

*Example 1*

1.6 grams of 2-bromo-1,4-dihydroxyanthraquinone, 1.02 grams of N,N-dimethyl-1,3-trimethylendediamine and 20 cc. of chloro-benzene were refluxed together for 4 hours. The reflux condenser was removed and the reaction mixture was boiled to remove excess N,N-dimethyl-1,3-trimethylenediamine. The residual solution was divided into two equal parts.

A. One part was drowned in 5 times its volume of hexane, cooled and filtered. The product which collected on the filter was washed with hexane and then air-dried. The dye compound obtained has the formula:

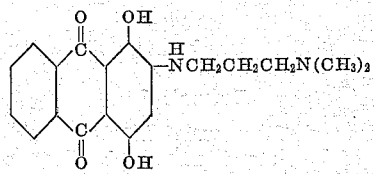

It dyes acrylonitrile polymer textile materials, such as Verel and Orlon 42, bright red shades which have excellent fastness to light and good fastness to washing, gas and sublimation.

B. One cc. of dimethylsulfate was added to the second part and the resulting mixture was heated on the steam bath for 30 minutes, cooled and filtered. The product which collected on the filter was washed well with chlorobenzene and then dried in air. The methyl methosulfate quaternary salt form of the dye compound of part A was obtained. It likewise dyes acrylonitrile polymer textile materials, such as Verel and Orlon 42, bright red shades having excellent fastness to light and good fastness to washing, gas and sublimation.

*Example 2*

One gram of 2-bromo-1,4-dihydroxyanthraquinone and 5 cc. of N,N-dimethyl-ethylene diamine were gradually heated to refluxing conditions over a period of 1.5 hours and held at refluxing conditions for 2.5 hours. The reaction mixture was then cooled, drowned in 50 cc. of water, and 1 gram of $Na_2CO_3$ was added. A tarry product precipitated. This tarry product was recovered and dissolved in hot acetone and the resulting mixture was drowned in water. The dye compound which precipitated was recovered by filtration, washed with cold water and dried. The dye compound obtained has the formula:

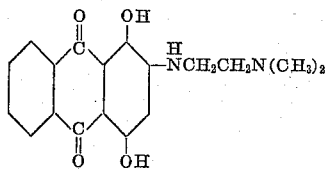

It dyes acrylonitrile polymer textile materials, such as Verel and Orlon 42, bright red shades which have excellent fastness to light and good fastness to washing, gas and sublimation.

*Example 3*

3.2 grams of 2-bromo-1,4-dihydroxyanthraquinone, 3 cc. of N,N-diethyl-2-hydroxy-1,3-trimethylenediamine and 30 cc. of ethylgene glycol monomethyl ether were refluxed together for 8 hours. The reaction mixture resulting was cooled to 10° C. and filtered. The dye compound which collected on the filter was washed well with water and then dried at 60° C. The dye compound thus obtained has the formula:

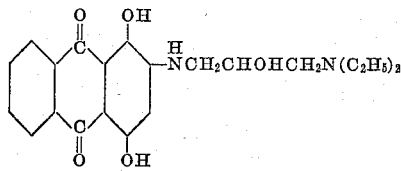

It dyes acrylonitrile polymer textile materials, such as Verel and Orlon 42, bright red shades having excellent fastness to light and good fastness to washing, gas and sublimation.

*Example 4*

1.6 grams of 2-bromo-1,4-dihydroxyanthraquinone, 1.44 grams of N-methyl-N-n-butyl-1,3-trimethylenediamine and 20 cc. of chlorobenzene were refluxed together for 4 hours. Excess N-methyl-N-n-butyl-1,3-trimethylenediamine was removed by distillation and then the reaction mixture was worked up in accordance with the procedure described in Example 1A. The dye compound obtained colors acrylonitrile polymer textile materials, such as Verel and Orlon 42, bright red shades having excellent fastness to light and good fastness to washing, gas and sublimation.

*Example 5*

1.6 grams of 2-bromo-1,4-dihydroxyanthraquinone, 0.60 gram of ethylene diamine and 20 cc. of chlorobenzene were refluxed together for 4 hours. Excess ethylene diamine was removed by distillation and then the reaction mixture was worked up in accordance with the procedure described in Example 1A. The dye compound obtained dyes acrylonitrile polymer textile materials, such as Verel and Orlon 42, bright red shades which have excellent fastness to light and good fastness to washing, gas and sublimation.

*Example 6*

5 grams of the sodium salt of 1,4-dihydroxyanthraquinone-2-sulfonic acid and 15 cc. of N,N-dimethyl-1,3-trimethylenediamine were heated, with stirring, on a steam bath for 4 hours. The reaction mixture resulting was cooled, diluted with 30 cc. of methyl alcohol and then brought to a total volume of 250 cc. by the addition of water. The solution was made neutral by the addition of dilute hydrochloric acid and the solid which precipitated was recovered by filtration, washed with cold water and dried in air. The dye compound obtained is identical to that of Example 1A.

*Example 7*

Example 3 was repeated using 4 grams of N,N-diethyl-1,3-trimethylenediamine in place of N,N-diethyl-2-hydroxy-1,3-trimethylenediamine. The dye compound obtained dyes acrylonitrile polymer textile materials bright red shades having excellent fastness to light and good fastness to washing, gas and sublimation.

*Example 8*

Example 1B was repeated using 2 cc. of benzyl bromide in place of dimethyl sulfate. The quaternary ammonium dye compound obtained has the same dyeing properties as the quaternary ammonium dye compound of example 1B.

The non-quaternary compounds of the invention can be readily converted to a quaternary ammonium salt form by treatment with a quaternizing agent. This procedure is well known and is illustrated in Examples 1B and 8. Thus, for example, the methyl methosulfate form the dyes of Examples 2, 3, 4, 5, 6 and 7 is obtained by treating these dye compounds with dimethyl sulfate. The quaternary ammonium compounds obtained have the dyeing properties described herein.

The following example illustrates how the non-quaternary anthraquinone compounds of our invention can be used to dye acrylonitrile polymer textile materials.

*Example 9*

16.7 milligrams of the dye compound prepared in Example 1A were dissolved by warming in 5 cc. of ethylene glycol monomethyl ether. 20 cc. of a 1% aqueous solution of Igepon T

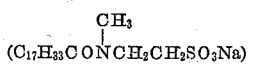

were added and the volume brought to 200 cc. by the addition of water at 50° C. Five cc. of a 30% aqueous solution of formic acid were added, followed by 5 grams of Verel fabric. The temperature was brought to the boil and held there for 1 hour. The cloth was then rinsed in hot water and allowed to dry. It was dyed an attractive red shade having excellent fastness to light and good fastness to gas, washing and sublimation. Similar results are obtained when Orlon 42 fabric is used instead of Verel fabric.

The following example illustrates how the quaternary ammonium anthraquinone compounds of our invention can be applied to acrylonritile polymer textile materials.

*Example 10*

16.7 milligrams of the dye product of Example 1B were dissolved in 200 cc. of water and 5 grams of Verel fabric were added. The temperature was raised to 90° C. to 95° C. and 5 cc. of a 5% aqueous solution of formic or acetic acid were added. The temperature was maintained at 90° C. to 95° C. for 1 hour. The goods were then removed from the dye bath, rinsed in hot water and allowed to dry. The Verel fabric was dyed an attractive red shade having excellent fastness to light and good fastness to washing, gas and sublimation. Similar results are obtained when an Orlon 42 fabric is dyed.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The anthraquinone compounds having the formula:

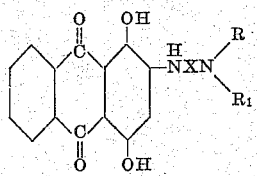

wherein X represents a member selected from the group consisting of an alkylene radical having 2 to 3 carbon atoms and a 2-hydroxytrimethylene radical and R and $R_1$ each represents a member selected from the group consisting of a hydrogen atom and an alkyl group having 1 to 4 carbon atoms.

2. An anthraquinone dyestuff of the formula

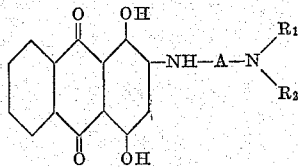

in which A is lower alkylene and each of $R_1$ and $R_2$ is lower alkyl.

3. The anthraquinone compound having the formula:

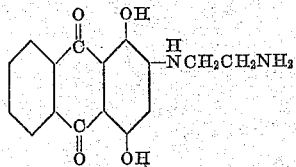

4. The anthraquinone compound having the formula:

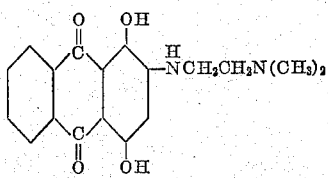

5. The anthraquinone compound having the formula:

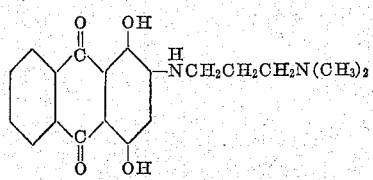

6. The anthraquinone compound having the formula:

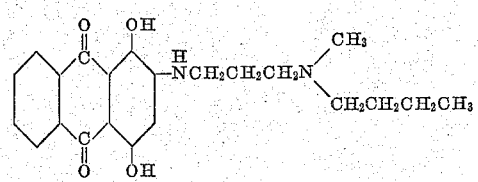

7. The anthraquinone compound having the formula:

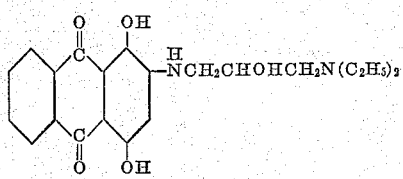

References Cited in the file of this patent

UNITED STATES PATENTS

| | | |
|---|---|---|
| 2,924,609 | Joyce | Feb. 9, 1960 |
| 3,040,064 | Grossmann | June 19, 1962 |